United States Patent [19]

Larson

[11] Patent Number: 4,602,466

[45] Date of Patent: Jul. 29, 1986

[54] FOAM BUILDING PANELS

[76] Inventor: Roger E. Larson, P.O. Box 7123, Carmel, Calif. 93921

[21] Appl. No.: 450,732

[22] Filed: Dec. 17, 1982

[51] Int. Cl.[4] .............................................. E04C 2/26
[52] U.S. Cl. .................................... 52/309.11; 156/79; 264/46.5; 428/71; 428/192
[58] Field of Search .................... 52/601, 309.11, 809, 52/592, 309.9; 428/192, 45, 71; 264/46.5, 46.4, 46.6; 156/79

[56] References Cited

U.S. PATENT DOCUMENTS

| | | | |
|---|---|---|---|
| 1,706,769 | 3/1929 | Buck | 52/592 |
| 2,014,841 | 9/1935 | Heeren | 52/601 |
| 2,142,305 | 1/1939 | Davis | 52/601 |
| 2,744,042 | 5/1956 | Pace | 52/309.11 |
| 2,866,730 | 12/1958 | Potchen | . |
| 3,153,817 | 10/1964 | Pease | 52/309.9 |
| 3,305,986 | 2/1967 | Mathews | 52/309.11 |
| 3,310,917 | 3/1967 | Simon | 52/601 |
| 3,367,076 | 2/1968 | O'Brien | 52/309.11 |
| 3,369,065 | 2/1968 | Keith | 264/47 |
| 3,446,692 | 5/1969 | Turnbull | . |
| 3,462,897 | 8/1969 | Weinrott | 52/309.11 |
| 3,472,728 | 10/1969 | Hitch | 52/809 |
| 3,510,391 | 5/1970 | Bolster et al. | . |
| 3,555,131 | 1/1971 | Weismann | 264/45 |
| 3,560,285 | 2/1971 | Schroter | . |
| 3,583,118 | 6/1971 | Lowery | 52/309.11 |
| 3,649,324 | 3/1972 | Payne | . |
| 3,665,662 | 5/1972 | Timbrook | . |
| 3,738,895 | 6/1973 | Paymal | 156/443 |
| 3,834,967 | 9/1974 | Lowery et al. | 156/356 |
| 3,915,773 | 10/1975 | Bengtson | 156/79 |
| 3,917,775 | 11/1975 | Nilsen | 264/46.5 |
| 3,956,549 | 5/1976 | Stoeberi | 428/71 |
| 3,972,410 | 8/1976 | Shaffer et al. | 198/31 |
| 3,972,667 | 8/1976 | Hanusa | 425/224 |
| 3,999,648 | 12/1976 | Kennedy | 198/437 |
| 4,037,006 | 7/1977 | Roberts | . |
| 4,037,377 | 7/1977 | Howell | 52/592 |
| 4,043,719 | 8/1977 | Jones | . |
| 4,147,582 | 4/1979 | Brollo | 156/462 |

OTHER PUBLICATIONS

Reinhold Plastic Application Series "Polyurethanes" by Dombrow. Copy received 10-1962.

Primary Examiner—John E. Murtagh
Attorney, Agent, or Firm—Jack M. Wiseman

[57] ABSTRACT

A method and apparatus for making building panels includes means for positioning upper and lower rigid sheets of material, such as paper pulp, in spaced relation so that foamable material disposed between the sheets can move into gripping engagement with both sheets as it expands and solidifies.

3 Claims, 11 Drawing Figures

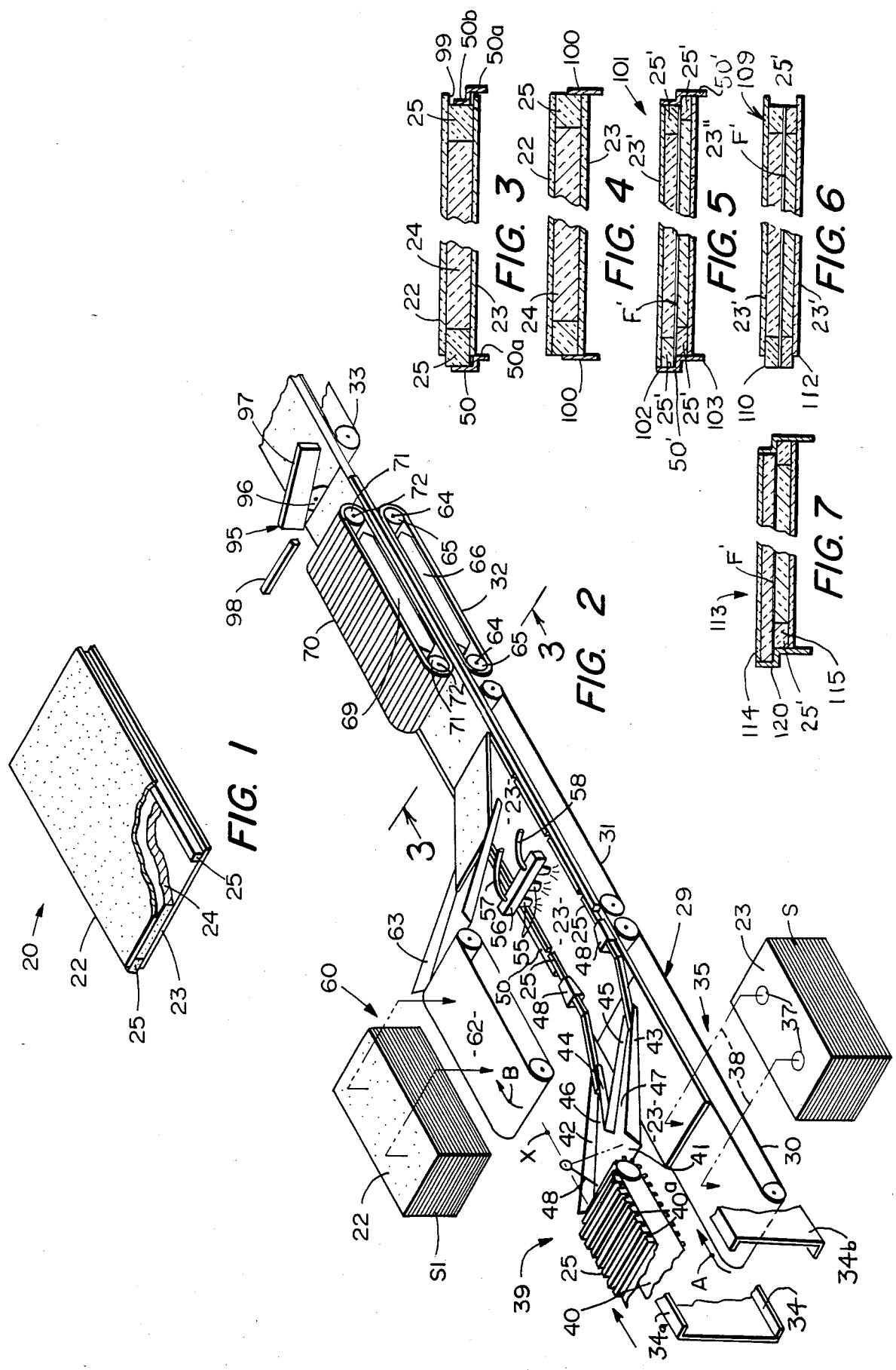

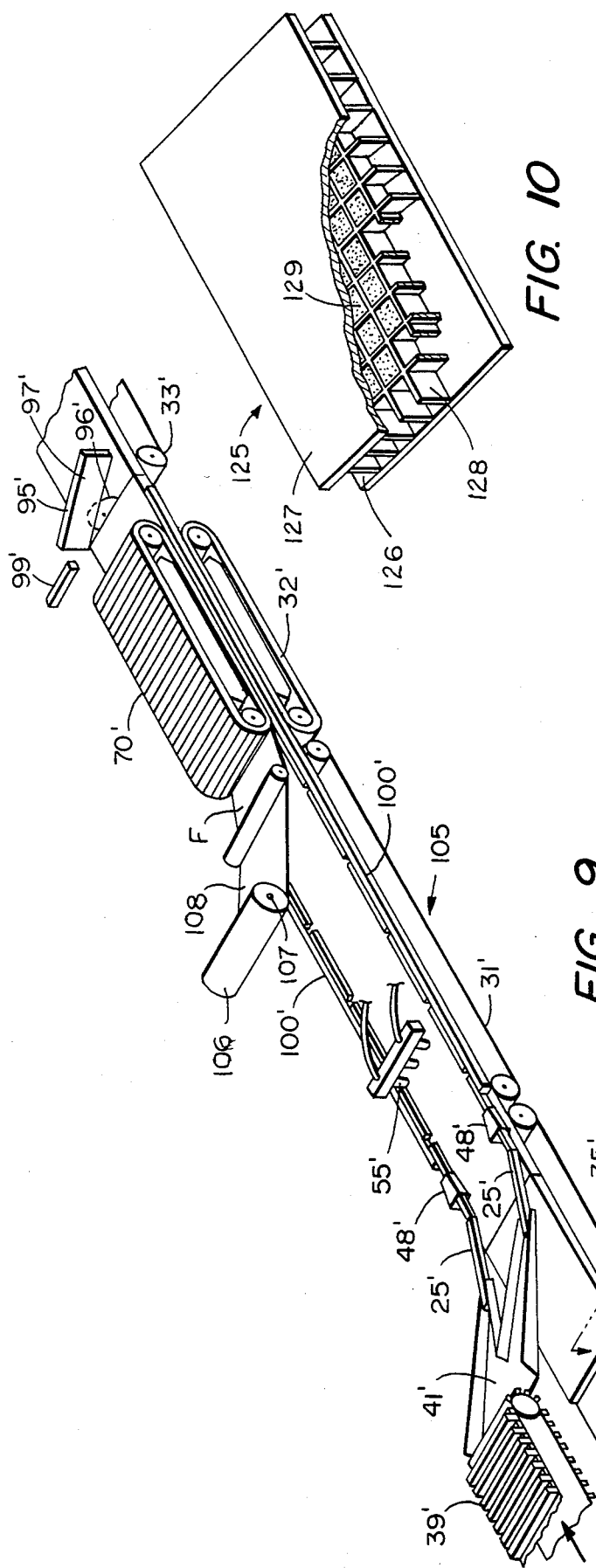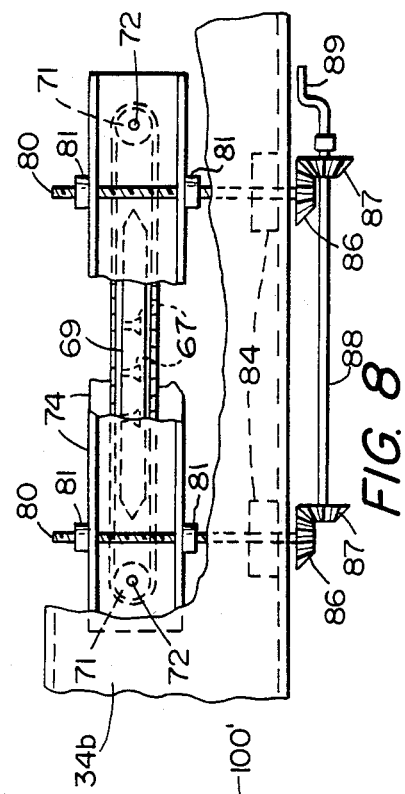

FOAM BUILDING PANELS'

BACKGROUND OF THE INVENTION

Composite building panels, consisting of two parallel facing sheets disposed in spaced relation and having a core of foam material between them, have been produced for some time. One method of producing such a panel involves depositing foam on one facing sheet and allowing it to cure while in contact with the sheet so that the foam and the sheet adhere to each other. Then building paper is positioned over the expanding foam and the other facing sheet is then laminated to the building paper. When the facing sheets are relatively flexible members, they can be positioned in a generally continuous process. On the other hand, if the sheets are rigid, present processes require the manual handling of the sheets by trained operators—a relatively expensive operation.

Also, it has been found that a bonded joint between foam and a facing sheet is not as strong as a joint formed during the expansion and curing of foam against a facing sheet. Several patents, such as the patents to Potchen et al., U.S. Pat. No. 2,866,730; the patent to Schroter et al., U.S. Pat. No. 3,560,285; the patent to Roberts et al., U.S. Pat. No. 4,037,006; and the patent to Jones, U.S. Pat. No. 4,043,719 disclose processes in which foam is allowed to expand into gripping relation with two facing members during a continuous panel-forming operation. However, in these processes, at least one of the facing sheets is a relatively flexible, bendable member such as heavy paper, aluminum foil, or roofing paper as in Jones, U.S. Pat. No. 4,043,719 or fiber-glass reinforced resin as in Potchen et al., U.S. Pat. No. 2,866,730. In such panels the foam core, not the bendable facing sheet, is relied on to resist bending loads imposed on the panels.

Patents to Turnbull, U.S. Pat. No. 3,446,692; Bolster et al., U.S. Pat. No. 3,510,391; and Timbrook, U.S. Pat. No. 3,665,662 disclose building panels involving foam cores disposed between two facing sheets. None of these patents discloses a continuous method of forming the panels in a process that involves the expansion of the foam into adhering relation with both sheets. Accordingly, an object of this invention is to provide such a process and an apparatus for carrying it out.

SUMMARY OF THE INVENTION

A method and apparatus for producing composite sandwich-type building panels in a continuous process includes means for holding in place a top and a bottom sheet while foam is expanded between the sheets into gripping engagement therewith.

DESCRIPTION OF THE DRAWINGS

FIG. 1 is a diagrammatic perspective, with parts broken away, of one embodiment of a panel made according to the teaching of the present invention.

FIG. 2 is a diagrammatic perspective of a production line on which the panel of FIG. 1 can be assembled.

FIG. 3 is a fragmentary transverse section taken along line 3—3 of FIG. 2, with the conveying belts omitted.

FIG. 4 is a diagrammatic section, similar to FIG. 3, but having a modified set of side guard rails.

FIG. 5 is a transverse fragmentary section taken through a second form of the composite panel, with the conveyor belts omitted.

FIG. 6 is a view, similar to FIG. 5, showing an arrangement for orienting the sections of the panel of FIG. 5 differently.

FIG. 7 is a fragmentary diagrammatic section taken transversely through another embodiment of the panel of the present invention.

FIG. 8 is an enlarged diagrammatic side elevation, with parts broken away, of a part of the production line of FIG. 2.

FIG. 9 is a diagrammatic perspective of a second production line of the present invention.

FIG. 10 is an enlarged perspective, with parts broken away, of an additional embodiment of the panel of the present invention.

FIG. 11 is a fragmentary diagrammatic section showing an end view of the panel of FIG. 10.

DESCRIPTION OF PREFERRED EMBODIMENTS

In FIG. 1 the reference numeral 20 indicates generally a building panel constructed using the method of the present invention. The panel consists of an upper sheet 22, a lower sheet 23, a core 24, and identical side stiffener bars 25. The core 24 is formed, in a manner to be explained hereinafter, of foamable material such as urethanes, styrenes and certain epoxy resinous materials. The stiffener bars 25 may be made of cellulosic materials such as wood, or they may be made of the same material as the upper and lower sheets 22 and 23 which, in the preferred embodiment, is a composition of compressed paper pulp marketed under the trademark Homasote by the Homasote Company of West Trenton, N.J. Other materials such as plywood or gypsum board can be used for the facing sheets.

The method of fabricating panels is diagrammatically shown in FIG. 2 wherein reference numerals 30, 31, 32 and 33 indicate a series of aligned endless belt conveyors which form a major part of a panel fabricating line 29. The conveyors are all driven at the same constant speed so that, when lower sheets 23 are placed one by one on the upper surface of conveyor 30, a line of sheets is advanced in end-to-end relation in the direction of arrow A through the fabricating line.

The conveyors 30–33 are mounted on a frame support structure 34 which includes spaced, relatively shallow channels 34a and 34b that extend for the entire length of the line and are supported in a raised position on a plurality of legs (not shown).

Each sheet 23 is placed on the conveyor 23 by a conventional transfer mechanism 35 which is schematically shown in FIG. 2 and includes a pair of suction cups 37 which receive air at a suction pressure from a suitable source and are mounted for up-and-down and back-and-forth movement on an elevated support structure 38. The transfer mechanism is actuated in timed relation with the movement of the upper surface of conveyor 30, and the suction cups are arranged to move to a position above a stack S of sheets 23, downwardly to grip the topmost sheet on the stack, upwardly to remove the sheet from the stack, laterally to a position over the conveyor 30, and then downwardly to position the sheet on the conveyor surface as the suction in the cups is released. The speed of movement of the transfer mechanism 35 is so coordinated with the speed of movement of the upper surface of conveyor 30 that each new sheet is placed on the conveyor so that the leading edge of the new sheet is close to the trailing edge of the preceding sheet on the conveyor.

Stiffener bars 25 are deposited on the upper side portions of the line of sheets 23 by means of an overhead feed mechanism 39 which includes an endless belt conveyor 40 on which the bars are manually or mechanically deposited between spaced lugs 40a in a position extending transversely of the direction of movement of the upper surface of the conveyor. The conveyor 40 is mounted on a suitable support directly above and parallel to conveyor 30. Each stiffener bar 25 is dropped off the end of conveyor 40 onto an inclined feed table 41 which is parallel to conveyor 30 and has side walls 42 and 43, and inclined inner walls 44 and 45 which cooperate with the side walls to define two chutes 46 and 47 at the lower end of the table. Chute 66 is arranged to guide stiffener bars onto one side portion of a facing sheet 23 passing therebelow, and chute 47 directs bars onto the other side edge portion of the sheet. To orient the stiffener bars so that they will enter the chutes 46 and 47, a diverter bar 48 is mounted above the inclined table near the top end of the table. The diverter is mounted for oscillating movement about an axis X, that is generally parallel to the plane of the table 41, and is arranged to be moved alternately from a position at one side of the longitudinal centerline of the table to the other side of the centerline. Thus, when the diverter is in the full line position of FIG. 2, one side of a stiffener bar sliding transversely down the upper portion of the table will engage the diverter and the portion of the bar engaging the diverter will be detained, causing the opposite end of the bar to swing down to a leading position. The bar will then move endwise into the chute 47 for guidance onto the sheet 23 on conveyor 30. As soon as the stiffener bar passes out of contact with the diverter, the diverter is swung to the dotted line position to intercept and pivot the next stiffener bar and cause it to enter chute 46.

It will be evident that the drive mechanism that oscillates the diverter must operate in timed relation with the movement of the conveyor 40, and that the conveyor 40 must be operated at a speed related to the speed of the sheet conveyor 30 so that a substantially continuous line of stiffener bars are deposited along each side edge of the continuous line of sheets 23. It will be noted however that, when each gravity-fed stiffener bar 25 comes into contact with the upper surface of a moving sheet 23, a slight gap is opened up between the leading end of the stiffener bar and the trailing end of the stiffener bar next ahead. These small gaps are used at a later step in the process as vent passages that allow the escape of gases generated during the foaming operation.

Shortly after each stiffener bar 25 is deposited on a moving sheet 23, the bar enters a funnel guide 48 which is of inverted U-shape, is open on the bottom side and has a downwardly inclined top wall and two side walls which are inclined inwardly to guide the bars 25 to a particular path of movement. The funnel is secured to a member of the support structure 34 in fixed position just above the surface of the moving sheet. The exit end of each funnel is oriented so that each bar will be aligned generally parallel to the adjacent edge of the sheet 23, but not necessarily flush with the edge. Metal edge guides 50 (FIG. 3) are mounted on support structure 34 alongside the upper moving surface of the conveyor 30, and each guide is provided with a wall portion 50a disposed close to a side edge of sheet 23 and an upper wall portion 50b that limits the outward movement of the adjacent stiffener bar 25 when the foam expands and exerts pressure on the stiffener bar.

Foam is deposited on the upper surface of the continuously moving sheets by a plurality of dispensing nozzles 55 (FIG. 2), which communicate with a header 56 that receives a continuous supply of foamable material under suitable pressure from a source of foamable material and catalysts through conduits 57 and 58.

Upper sheets 22 are brought into the fabricating line by a suction cup feed mechanism 60 that may be of any conventional design such as the feed mechanism 35 which handles the lower sheets 23. The feed mechanism 60 removes the uppermost sheet 22 from a stack $S_l$ of sheets, raises it, moves it laterally to a position over an endless belt conveyor 62, lowers it, and deposits it on the conveyor 62 which is positioned directly above and parallel to the conveyor 30. Each sheet is moved forwardly to the direction of arrow B and dropped onto an inclined trough 63 which has a lower end closely adjacent the upper surfaces of the foam and the stiffener bars that are moving along therebelow. The feed mechanism 60 and conveyor 62 are coordinated with the speed of the belt conveyors 30 and 31 so that each sheet slides down the trough 63 and is deposited on the stiffener bars 25, as seen in FIG. 3, with its leading edge in abutting contact with the trailing edge of a sheet 22 that is already supported on the bars 25 and vertically aligned with the leading edge of the lower sheet 23 directly below. It will be understood that each upper sheet could be placed directly on the stiffener bars without the conveyor 62 and the trough 63 by a feed mechanism such as the mechanism 60.

It will be evident that the line of lower sheets 23 and the lines of stiffener bars 25 form a continuously moving open-top trough into which the foam is deposited and, when the top sheets 22 are positioned on this trough, a continuously moving chamber is formed in which the foamable materials react and expand.

The conveyor 32 includes spaced shafts 64 journalled for rotation in the channels 34a and 34b of the frame 34, a roller 65 keyed to each shaft, and a conveying surface made up of transverse metal slats trained around the rollers. A heating unit 66 that is connected to the frame of the conveyor 32 is disposed between the upper and lower runs of the conveyor. The heating unit can be of any conventional type that has heating elements, such as the radiant heaters 67 of FIG. 8, which heat the space adjacent the upper run of conveyor 32 and cause the metal slats of the conveyor to transmit heat to the sheet 23 and to the foam that is on the sheet, to accelerate the foaming action and the curing of the foam core. A heating unit 69, which may be identical to unit 66, is mounted between the runs of an endless conveyor 70 of metal slats that is directly above and aligned with slat conveyor 32. The conveyor 70 includes end rollers 71 carried by transverse shafts 72, one of which is driven. The rollers and slat of conveyor 70 press downwardly on the sheets 22 passing therebelow and prevent upward movement by the expanding foam. Both the conveyor 70 and heating unit 69 are supported in any conventional manner from the frame structure 34 so that they can be adjusted toward and away from the lower slat conveyor 32 to accommodate panels of different thicknesses. One arrangement could consist of a rigid support frame that includes two elongate upright shallow channels 74 (one only being shown in FIG. 8) interconnected in parallel spaced relation, one plate being disposed alongside and close to each side edge of the slat conveyor. The shafts 72 of the conveyor 70 are journalled for rotation in the upright plates 74, and a drive mechanism, not shown, is connected in driving relation with one of the shafts.

To accommodate various thicknesses of panels, the conveyor 70 is made adjustable relative to the lower conveyor 32 by a plurality of adjusting screws 80 that are mounted at each side of the conveyor. Near its upper end, each screw 80 is threaded through blocks 81 that are secured to one of the upright plates 74 of the conveyor frame, and near its lower end each screw has an unthreaded portion supported and journalled for rotation in a bearing block 84 secured to the innerface of one of the side channels 34a or 34b of the frame 34. In FIG. 8 the adjusting screws 80 at one side only of the conveyor are shown, and it will be noted that a bevel gear 86, which is keyed to the lower end of each screw, is in mesh with a bevel gear 87 keyed to a shaft 88. Accordingly, rotation of the shaft 88 by means of crank 89 will cause simultaneous and equal vertical movement of the parts of the frame to which the adjusting screws 80 are secured. If desired, the shafts 88 at each side of the conveyor may be connected for simultaneous movement by means of a sprocket and chain connection or any suitable connecting mechanism so that actuation of one crank will cause simultaneous and equal vertical movement of both frame members 74.

The speed of the conveying system of this fabricating line is such that by the time the panels being formed leave the down stream ends of the conveyors 32 and 70, the foam has set up and is in gripping engagement with both the upper sheet 22 and the lower sheet 23 and is ready to be severed into selected lengths. The cutting of the panels is carried out by a unit 95 (FIG. 2) that includes a circular saw 96 which is mounted in a frame 97 that extends above and transversely of the conveyors. This cutting unit is a conventional device and its frame includes a guide structure which is oriented at an angle to the direction of movement of the upper surface of the conveyor 32 and is adapted to guide the saw in the direction of movement of the conveying surfaces as it moves transversely of the surfaces. The speed of movement of the saw in the direction of movement of the panel it is cutting is exactly equal to the speed of movement of the panel so that the cut which is made in the panel by the saw extends at right angles to the side edges of the panel. The guide structure in the cutting unit is effective to cause the saw to be raised after the cut has been made and moved, at this elevated position, back to initial position where it is ready to be lowered and moved into engagement with the panel to make another cut. Preferably the cut is made at a gap between conveyors 32 and 33 so that the blade does not engage either conveyor belt.

It is desirable that the saw makes its cut across the moving panel formation at the ends of the top and bottom sheets 22 and 23, respectively. As mentioned above, the speeds of the conveyors 30 and 31, and the actuation of the sheet feed mechanisms is coordinated so that a top sheet 22 is deposited directly above a bottom sheet 23 with the leading edges of the sheets and the trailing edges in vertical alignment. To coordinate the movement of the saw with the movement of the panelling, a conventional phototube mechanism 98 is disposed above the path of movement of the panelling between the downstream end of conveyor 70 and cutting unit. The phototube is arranged to sense the leading edge of a sheet 22 therebelow and, through a control mechansim, actuate the saw when the edge of the sheet has advanced to the proper position for the cut to be made at the edge. With this arrangement, if the sheets 22 and 23 are eight feet long, for example, panels that are eight feet long will be formed and discharged from the conveyor 33.

As seen in FIG. 3, the edge guides 50 position the longitudinal stiffener bars 25 so that a recess 99 is formed between the sheets 22 and 23 at one side of the panel while, at the other side, the stiffener bars outwardly past the side edges of the sheets. With this construction, adjacent panels can later be assembled during a building operation with a tongue-and-groove joint. FIG. 4 discloses an alternative pair of metal guides 100 that position the adjacent stiffener bars so that their side edges are flush with the side edges of the top and bottom sheets 22 and 23.

In FIG. 5 a panel 101 is illustrated which consists of a top section 102 and a bottom section 103. The top section includes a rigid sheet 23', side stiffener bars 25', a foam core 24', and a relatively thin membrane cover F'. This section may be formed in the fabrication line 105 of FIG. 9 which includes a plurality of endless belt conveyors 30'-33' that are indentical to the conveyors 30-33 of FIG. 1. Other mechanisms in this assembly line 105 that are identical in design and operation to mechanisms of assembly line 29 of FIG. 2 will be given identical reference numerals followed by a prime symbol. This assembly line differs from line 29 in that a feed mechanism 106 for flexible feeding roll material, such as aluminum foil or heavy kraft paper, is substituted for the rigid panel feed mechanism 60. The feed mechanism 106 includes a shaft 107 drivingly connected to a supply roll 108 and to a drive mechanism (not shown) which feeds the material from the supply roll at the same speed as the rigid sheets 23' are advanced by the belt conveyors 30'-33'.

It will be evident that, if the conveyor 70' is adjusted for the desired thickness of panel, guide bars 100' are installed at each side, and the mechanisms of the assembly line 105 are actuated to remove lower sheets 23' from a stack S' and deposit them on conveyor 30', position feed stiffener bars 25', of suitable thickness on the upper side edge portions of each sheet 23', deposit foamable material in the moving trough defined by the sheets and stiffener bars, and deposit a layer of aluminum foil F or the like across the trough, the foam will expand and be cured as it progresses between the heaters. The cutting mechanism 95' will cut the moving column into panels of the desired length to form the top section 102 of the panel of FIG. 5.

The bottom section 103 of panel 101 comprises a rigid lower sheet 23' and stiffener bars 25' that are of the same thickness as the bars 25' of section 102. After a supply of top sections 102 is available, the formation of the entire panel 101 of FIG. 5 is carried out in the assembly line 29 of FIG. 2 by substituting a supply of the top sections 102 for the sheets 22 in stack $S_l$, with the relatively thin membrane F' facing downwardly as seen in FIG. 5. Also, sheets 23' are substituted for sheets 23 in stack S, and stiffener bars 25' of the proper thickness are inserted in the bar feed mechanism 39. Then, when line 29 is actuated, foamable material will be deposited in the moving trough defined by the sheets 23' and the stiffener bars 25'. On the downstream side of the nozzles 55, the feed mechanism 60 deposits top sections 102 on the moving trough with the membrane F facing downwardly. Accordingly, the foam expands upwardly to grip the surface of the foil, or whatever other thin membrane is on the bottom surface of the panel 101, and also grips the stiffener bars and the lower sheet 23'. It will be evident that offset metal guides 50' may be used, which are similar to guides 50 of FIG. 3, and are adapted to orient the side edges of the sections in overlapping relation as shown in FIG. 5.

In FIG. 6 a panel 109 is shown that is substantially identical to the panel 101 of FIG. 5 and includes an upper section 110 and a lower section 112. Panel 109 is fabricated in exactly the same manner as panel 101 except that, in forming upper section 110, the metal guides of FIG. 9 that orient the side edges of the stiffener bars 25' of the upper section 110 of the panel 109 relative to the base sheet 23' are arranged to orient the side edges of the stiffener bars 25' in offset relation to the sheet 23'. Then, when the entire panel 109 is completed on the assembly line 29 of FIG. 2, the metal guides 50 will orient the stiffener bars 25' of lower section 112 in offset relation to the base sheet 23' of section 112, and will orient the completed upper section 110 so that the side edges of the stiffener bars of both sections are in alignment.

The embodiment 113 of FIG. 7 includes an upper section 114 and a lower section 115. Upper section 114 is similar to upper section 102 of FIG. 5 except that section 114 has no side stiffener bars. It is formed in assembly line 105 by deactivating the stiffener-bar feeding mechanism 39' and coating the top and inner surfaces of the guide rails 100 with a release coating, such as a detergent or silicone, so that the bottom sheets 23' and the side guide form a through into whch foamable material is deposited by the nozzles 55'. As the sheets 23' move along, the material expands in this trough, with the release material coating on the guide rails permitting the foam to move along with the base sheets 23'. When a membrane, such as foil F, is brought into place, the foaming material expands and grips the undersurface of the foil. As the composite strip moves between the conveyors 32' and 70', the curing of the foaming material is completed and the cutting mechanism 95' cuts off panels of desired length from the strip of panelling to form sections 114.

The bottom section 115 of panel 113 includes a base sheet 23' and stiffener bars 25', the stiffener bars being approximately as thick as the foam layer of section 114. After a supply of top sections 114 is available, the formation of the entire panel 113 is completed in the assembly line 29 of FIG. 2 by substituting the supply of top sections 114 for the sheets 22 in stack S₁ with the relatively thin membrane or foil F facing downwardly as seen in FIG. 7. Also, sheets 23' are substituted for the sheets 23 in stack S and stiffener bars 25' of proper thickness are inserted in the bar feed mechanism 39. Then, when line 29 is actuated, foamable material will be deposited in the moving trough defined by the sheets 23' and the bars 25'. On the downstream side of the nozzles 55, the feed mechanism 60 deposits inverted top sections 114 on the moving trough. Accordingly, the foaming material expands upwardly to grip the membrane F on the underside of each section 114 while it also establishes gripping contact with the base sheets 23'. Appropriate side guides 120 are used to obtain an offset arrangement between sections 114 and 115.

In FIGS. 10 and 11, a further embodiment of a panel is illustrated. This panel 125 includes a lower sheet 126, an upper sheet 127, a rectangular grid or honeycomb spacer and support member 128 of paper, cardboard or any material having structural strength when arranged in a grid pattern, and solidified foam 129 disposed in the pockets of the honeycomb. This panel may be formed in the assembly line of FIG. 9 by deactivating the stiffener bar feed mechanism 39' so that a substantially continuous line of lower sheets 23' is moved under the nozzles 55' between the upright metal guide 100' which are in the form shown in FIG. 11. When a sheet 23' has entirely passed the nozzles, a grid 128 of the same width as the sheet is manually placed over the sheet in end-to-end relation. The weight of the grid causes it to sink down in the foam As soon as the grid is in position, a top sheet 127 is manually or mechanically positioned over the grid so that it rests on the upper edges of this member and restricts upward expansion of the foam as the 3-piece panel strip moves forwardly between the heated conveyors 32' and 70'. Alternately the grids can be positioned on the lower sheets upstream from the nozzles so that the foam is directed downwardly into the compartments of the grid.

Again, the detector 99' senses the leading edge of the composite panel section and actuates the saw 96' at an appropriate interval to cut off panels of appropriate length.

Certain operations of the assembly line of FIG. 9 have been described as being carried out manually. It will be evident that these operations could be done by automatically timed and actuated mechanism. For example, the grids could be directed down onto the foam by means of the sheet feed mechanism 60 of FIG. 2, and the upper sheet 127 of the panel 125 could be positioned on the grid by the sheet feed mechanism 60 of FIG. 2 if it is mounted downstream a short distance from the grid feed mechanism.

Suitable control mechanisms may be used to accurately align and maintain the alignment of the various sheets and spacer members of the panel and this control mechanism could include various speed motors for the conveyors, phototube sensors for sensing the position of various elements of the panel and speeding up or slowing down the motors to maintain the desired alignment.

From the foregoing description it will be apparent that the present invention provides a novel continuous process for making composite panels without the use of adhesives to secure members of the panels together, by taking advantage of the ability of foam to automatically move into engagement with adjacent surfaces and cling thereto as it expands and solidifies. This process makes possible, for the first time, the continuous, uninterrupted production of sandwich-type panels having non-bending sheets adhering to a foam core. As mentioned hereinabove panels have been produced in a continuous process wherein the facing sheets are bendable and all loads, which tend to bend the panels, are absorbed by the foam core. In the present invention, the facing sheets are rigid enough to absorb such bending stresses. Accordingly, in the claims, the term "rigid" will be used to mean any sheet that is relatively non-bendable and capable of absorbing normal bending loads. Also, as mentioned above, some prior art panels have facing sheets bonded, as by an adhesive, to the foam core. Since, in the present invention, the foam grips both facing sheets incident to the expansion and curing of the foam, the phrase "adhered directly" will be used in the claims to define applicant's engagement of the foam and the sheets.

I claim:

1. A composite panel comprising a lower rigid sheet, a rigid unit disposed in spaced relation to said lower sheet and consisting of a first foam block secured between an upper rigid sheet and a thin membrane, a second foam block adhered directly to said lower sheet and to the membrane of said unit and disposed between said lower sheet and said unit, said first foam block adhering to said upper rigid sheet and said membrane as the foam thereof expands and solidifies, said second foam block adhering to said lower sheet and said membrane as the foam thereof expands and solidifies, and a first stiffener bar along each side of said second foam block in gripping engagement with said second block, said first stiffener bars being substantially disposed between said membrane and said lower rigid sheet, said second foam block adhering to said first stiffener bars as the foam thereof expands and solidifies.

2. A composite panel according to claim 1 wherein said lower rigid sheet includes oppositely directed marginal side edges, one of said stiffener bars being disposed inwardly from one of said marginal side edges of said lower rigid sheet and another of said stiffener bars being disposed outwardly from an overlying relation to the other of said oppositely directed marginal side edges of said lower rigid sheet.

3. A composite panel comprising a lower rigid sheet, a rigid unit disposed in spaced relation to said lower sheet and consisting of a first foam block secured between an upper rigid sheet and a thin membrane, a second foam block adhered directly to said lower sheet and to the membrane of said unit and disposed between said lower sheet and said unit, said first foam block adhering to said upper rigid sheet and said membrane as the foam thereof expands and solidifies, said second foam block adhering to said lower sheet and said membrane as the foam thereof expands and solidifies, and a first stiffener bar along each side of said second foam block in gripping engagement with said second foam block, said second foam block adhering to said stiffener bars as the foam thereof expands and solidifies, said rigid unit including a second stiffener bar along each side of said first foam block in gripping engagement with said first foam block, said first foam block adhering to said second stiffener bars as the foam thereof expands and solidifies, said second stiffener bars being formed with outer side surfaces adhering to said first foam block and said first stiffener bars being formed with outer side surfaces adhering to said second foam block, the outer side surfaces of said second stiffener bars adhering to said first foam block being offset relative to the outer side surfaces of the first stiffener bars adhering to said second foam block.

* * * * *